(12) United States Patent
Caldas

(10) Patent No.: US 8,756,144 B2
(45) Date of Patent: Jun. 17, 2014

(54) SECURITIES AUCTION SYSTEM AND METHOD

(75) Inventor: Joseph J. Caldas, Watchung, NJ (US)

(73) Assignee: Hartfield Titus & Donnelly LLC., Jersey City, NJ (US)

( * ) Notice: Subject to any disclaimer, the term of this patent is extended or adjusted under 35 U.S.C. 154(b) by 879 days.

(21) Appl. No.: 11/564,551

(22) Filed: Nov. 29, 2006

(65) Prior Publication Data

US 2008/0126236 A1 May 29, 2008

(51) Int. Cl.
*G06Q 40/00* (2012.01)

(52) U.S. Cl.
CPC ...................................... *G06Q 40/00* (2013.01)
USPC .......................................................... 705/37

(58) Field of Classification Search
USPC ............................... 705/35, 36, 37, 38, 39, 40
See application file for complete search history.

(56) References Cited

U.S. PATENT DOCUMENTS

| | | | |
|---|---|---|---|
| 5,915,209 A * | 6/1999 | Lawrence | 340/3.7 |
| 6,161,099 A * | 12/2000 | Harrington et al. | 705/36 R |
| 6,560,580 B1 * | 5/2003 | Fraser et al. | 705/36 R |
| 6,850,907 B2 * | 2/2005 | Lutnick et al. | 705/37 |
| 6,876,309 B1 * | 4/2005 | Lawrence | 340/825.26 |
| 6,963,856 B2 * | 11/2005 | Lutnick et al. | 705/37 |
| 7,024,387 B1 * | 4/2006 | Nieboer et al. | 705/37 |
| 7,526,443 B2 * | 4/2009 | Agarwal et al. | 705/35 |
| 8,015,097 B2 * | 9/2011 | Lawrence | 705/37 |
| 2002/0095369 A1 * | 7/2002 | Kaplan et al. | 705/37 |
| 2002/0156719 A1 * | 10/2002 | Finebaum et al. | 705/37 |
| 2002/0161690 A1 * | 10/2002 | McCarthy et al. | 705/37 |
| 2002/0188555 A1 * | 12/2002 | Lawrence | 705/37 |
| 2003/0139997 A1 * | 7/2003 | Ginsberg | 705/37 |
| 2003/0220867 A1 * | 11/2003 | Goodwin et al. | 705/37 |
| 2006/0173769 A1 * | 8/2006 | Vales | 705/37 |
| 2007/0061231 A1 * | 3/2007 | Kim-E | 705/35 |
| 2007/0162379 A1 * | 7/2007 | Skinner | 705/37 |
| 2007/0226118 A1 * | 9/2007 | Gill | 705/37 |

OTHER PUBLICATIONS

Title: New Trade System for Odd-lots by: James Ramage Article in:The Bond Buyer vol. 385 No. 33961 N.Y.,NY, Published: Tuesday, Aug. 13,2013—p. 1 continued on p. 6.

* cited by examiner

*Primary Examiner* — Bruce I Ebersman

(57) ABSTRACT

A system and method of conducting a securities auction through the use of a computer network including programs and databases to be accessed by participants through the Internet using a standard browser. The seller inputs bid requests through a website that may be accessed by bidders once they are logged into the host computer network. All bids are entered into the computer and are accessible to all bidders on a real time basis as the auction proceeds. Additionally the bids and their times of entry are updated automatically as the auction proceeds so that all bidders are aware of the prices and status of all bids and whether any trades have been executed.

12 Claims, 14 Drawing Sheets

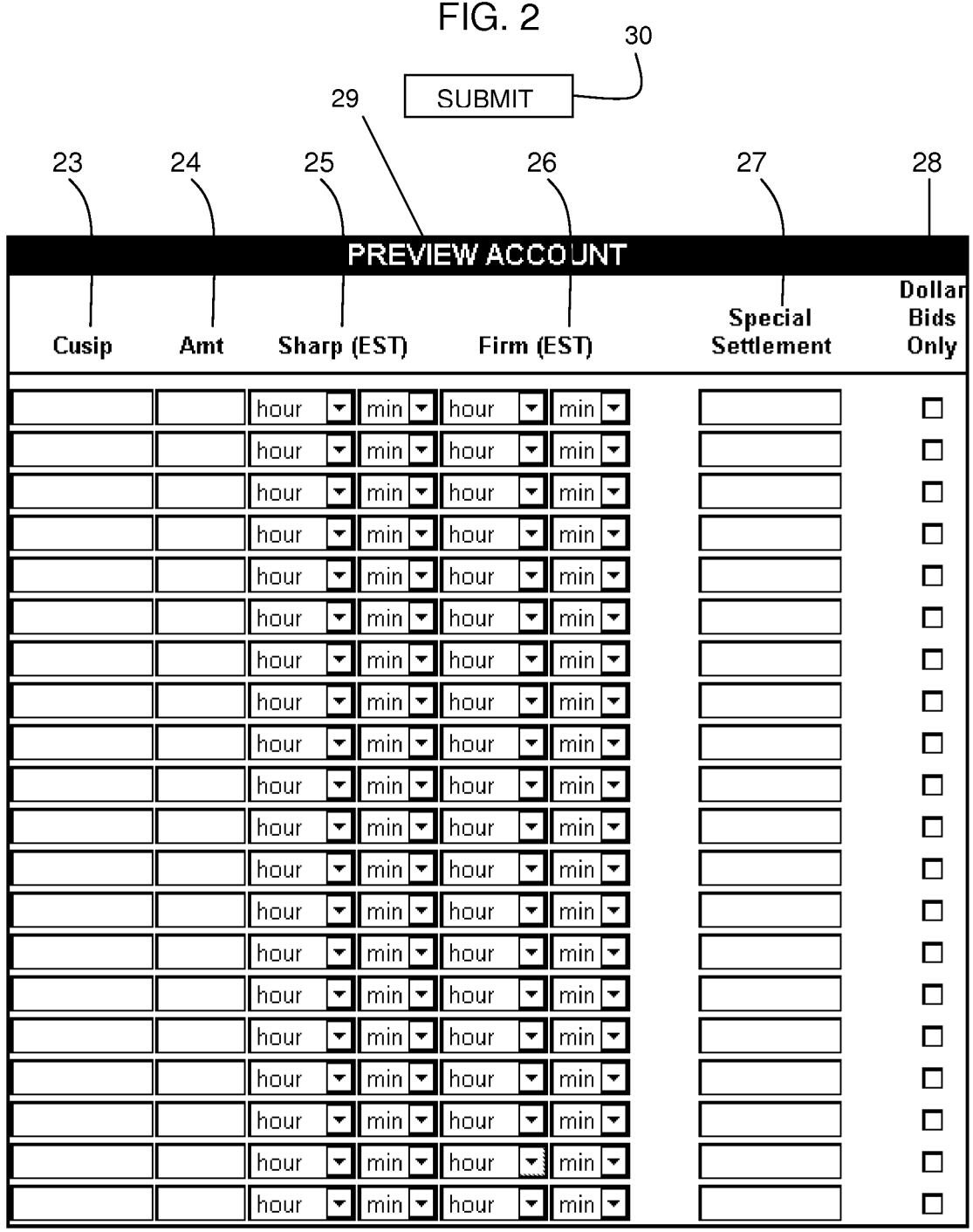

REVIEW YOUR AUCTION LOT. IF YOU AGREE, SELECT SUBMIT CHECK BOX AND CLICK THE SUBMIT BUTTON ABOVE

PREVIEW ACCOUNT

Submit

| Item # | Cusip | Amt | Sharp (EST) | Firm (EST) | WI | Settlement | Dollar Bids Only | Submit | Cancel |
|---|---|---|---|---|---|---|---|---|---|
| 25021 | 44372LAN1 | 1000 | 1 PM / 30 | 2 PM / 30 | ☐ | 05/31/2006 | ☐ | ☐ | ☐ |

44372LAN1   HUDSON CNTY NJ CORRECTIONAL FAC COP
AAA / AAA   [MBIA] [B/E]
DTD 05/13/2004   PRM CALL 12/01/2013 @ 101.000   5.250  12/01/2021
F/C 12/01/2004   PAR CALL 12/01/2015 @ 100.000   ST NJ
              MSF 12/01/2017 @ 100.000   TYPE REV
UND: NW CAPITAL

MATCHING BONDS
REF   AMT   YIELD   CONC   PRICE
OFR   2020  4.100           NET  108.098

Showing a search interface with:
- 38: main search form area
- 39: Saved Searches dropdown
- States list with Exclude checkbox
- Fields: Amount, Coupon, Maturity, Call Date, Sink Date, Put Date, Sharp Time, Item List, Cusip, Description, Moody's, S&P with Min/Max/Excl. columns
- Types section: BQ, COP, ETM, Pre-Re, Airport, Housing, Hospital, Zero's, High Yield, Tobacco, Exclude, Insured, Uninsured, AMT, Taxable, Exclude, G.O., Revenue, DBL, Non Callable
- Trade Status: Any
- Freshness: Any time
- Sort by: Update Time
- Time Standard: EST
- Results Layout: 2 Lines
- Results Set: All
- Search name field (40)
- Buttons: Go (41), Save (42), Reset (43), Delete (44)

Securities Auction System Search Results  Last updated 05/22/2006 10:30:52
{ 1 Line  Multi Line  Printable  Expanded  Selectable }

| Sharp | Firm | Item | Cusip | Amount | Description | Coupon | Mat | Moody | S&P | State | High Bid |
|---|---|---|---|---|---|---|---|---|---|---|---|
| N/T 09:30 | 09:45 | 4029 | 605579M57 | 2000 | MISSISSIPPI ST RFDGUT FSA N/C B/E | 6.000 | 09/2011 | AAA | AAA | MS | 110.274/3.827 |
| 09:30 | 11:00 | 3027 | 005158TB6 | 20 | ADA & CANYON CNTYS IDAHO B/E OY: 4.630 P 08/15/2010 @ 100.000 | 4.500 | 08/2025 | AAA | NR | ID | 100.146/4.460 |
| TRD 09:30 | 09:45 | 6011 | 792554QV2 | 1000 | SAINT MARYS CNTY MD CNTY B/E OID OY: 5.650 | 5.500 | 10/2009 | AA3 | AA- | MD | 106.669/3.650 |
| TRD 09:30 | 11:00 | 27002 | 645916WS2 | 2000 | NJ EDA SCH FAC CONSTR MBIA N/C B/E OY: 3.000 | 5.000 | 09/2012 | AAA | AAA | NJ | 106.231/3.870 |
| TRD 09:30 | 11:00 | 27001 | 14760PAH8 | 2000 | CASINO REINVESTMENT AUTH AMBAC N/C B/E OY: 3.640 | 5.000 | 01/2014 | AAA | AAA | NJ | 106.227/4.040 |

| | | 50 | 51 | 52 | 53 | 54 | |
|---|---|---|---|---|---|---|---|
| 55 | Print | Close | Previous | Next | TBMA | History | Calculator |

ITEM: 25014  AMOUNT: 1000  T/D: 05/16/2006  S/D: 05/19/2006
STATUS: PENDING  BIDDING: OPEN  SHARP: 04:00  FIRM: 04:30

— 57

56 — Trade Status

PENDING ▼                                                    UPDATE

58 —

| 44372LAN1 | HUDSON CNTY NJ CORRECTIONAL FAC COP | 5.250 12/01/2021 |
|---|---|---|
| AAA / AAA | [MBIA] B/E | ST NJ |
| DTD 05/13/2004 | PRM CALL 12/01/2013 @ 101.000 | TYPE REV |
| F/C 12/01/2004 | PAR CALL 12/01/2015 @ 100.000 | |
| | MSF 12/01/2017 @ 100.000 | |
| UND: NW CAPITAL | | |

— 61

59 — S&P Eval Price 106.815  Yield 4.296        Mergent  Price 106.438  Yield 4.352

| TIME | YIELD | CONC | PRICE | NET YLD | SCALE |
|---|---|---|---|---|---|
| 12:32:47 | 4.30 | NET | 110.231 | 4.300 PRM | +0.23 |
| 12:22:15 | 4.31 | NET | 110.122 | 4.310 PRM | +0.24 |
| 13:16:11 | 4.30 | .375 | 109.856 | 4.369 PRM | +0.299 |
| 11:37:27 | 4.38 | NET | 109.366 | 4.380 PRM | +0.310 |

60

— 68

62 —             Yield    Conc    Price   Flat  Will Bid  Pass
       Bid    [    ]   [    ]   [    ]   ☐      ☐       ☐          SUBMIT
Auto Bid Upto [    ]   [    ]   [    ]             Bid Price Increment =.05
63 —                    *1/8=.125*
                                          64   65    66
                                                                — 67

HISTORY SEARCH RESULTS

| Trade Date | Ord | Stat | CUSIP | Amount | Description | Coupon | Pre-refund Maturity | Yield | Conc | Price | Scale |
|---|---|---|---|---|---|---|---|---|---|---|---|
| 05/22/2006 | OFR | | 717823P93 | 2700 | PHILADELPHIA | 5.000 | 09/01/2020 | 4.430 | NET | 103.903 | +0.210 |
| 05/18/2006 | OFR | | 717823P93 | 2775 | PHILADELPHIA | 5.000 | 09/01/2020 | 4.520 | NET | 103.275 | +0.240 |
| 05/17/2006 | OFR | | 717823P93 | 2775 | PHILADELPHIA | 5.000 | 09/01/2020 | 4.480 | NET | 103.555 | +0.230 |
| 05/16/2006 | OFR | | 717823P93 | 3050 | PHILADELPHIA | 5.000 | 09/01/2020 | 4.500 | NET | 103.418 | +0.220 |
| 05/15/2006 | OFR | | 717823P93 | 3050 | PHILADELPHIA | 5.000 | 09/01/2020 | 4.500 | NET | 103.419 | +0.200 |
| 05/12/2006 | OFR | | 717823P93 | 3310 | PHILADELPHIA | 5.000 | 09/01/2020 | 4.500 | NET | 103.420 | +0.220 |
| 05/11/2006 | OFR | | 717823P93 | 3310 | PHILADELPHIA | 5.000 | 09/01/2020 | 4.480 | NET | 103.561 | +0.220 |
| 05/10/2006 | OFR | | 717823P93 | 3415 | PHILADELPHIA | 5.000 | 09/01/2020 | 4.480 | NET | 103.562 | +0.220 |
| 05/09/2006 | OFR | | 717823P93 | 3440 | PHILADELPHIA | 5.000 | 09/01/2020 | 4.480 | NET | 103.565 | +0.220 |
| 05/08/2006 | OFR | | 717823P93 | 3440 | PHILADELPHIA | 5.000 | 09/01/2020 | 4.480 | NET | 103.566 | +0.220 |
| 05/05/2006 | OFR | | 717823P93 | 3520 | PHILADELPHIA | 5.000 | 09/01/2020 | 4.480 | NET | 103.567 | +0.190 |
| 11/16/2005 | OFR | | 717823P93 | 115 | PHILADELPHIA | 5.000 | 09/01/2020 | 4.410 | NET | 104.249 | +0.210 |

Total: 34,900

12 item(s) matched the given criteria.

FIG. 7

SAS CALCULATOR

| CUSIP | 717823P93 | | Moodys: AAA S&P: AAA Insured: FSA S&P UND: BBB-PHILADELPHIA PA GAS WKS FIFTH SER A-1 [B/E] | | |
|---|---|---|---|---|---|
| T/D | 05/23/2006 | Yield 4.45 | Concession | Price | 103.761 |
| S/D | 05/26/2006 | DTD 10/14/2004 | Int Acc Date 10/14/2004 | Issue Yield | 0.000 |
| Coupon | 5.000 | F/C 03/01/2005 | BP Value | | |
| Maturity | 09/01/2020 | Net Yield | + ▸ 01 ▸ | | |
| CallPrm | | @ (103.761) 4.636 | Annual Inc $135,000.00 0.070 | TaxRate 35 | TEY 6.846 7.132 |
| CallPar | 09/01/2014 | @ 100.000 | Current Yield 4.819 | Cap Gains 28 | |
| Effective | | @ (103.761) 4.450 | Duration 6.824 10.375 | ATY 4.450 | 4.636 |
| Prere | | @ | Mod Duration 6.676 10.149 | Disc Cutoff | N/A |
| Put | | @ | Convexity 0.536 1.306 | Reset | Calculate |
| Avg Life | | ☐ Calc to AL | | View Call Schedule | |
| Quantity | 2700 | Principal $2,801,547.00 | Interest $31,875.00 | Net | $2,833,422.00 |

PORTFOLIO MONITOR ALERT

1. SELECT THE ACTIVITIES YOU WISH TO MONITOR
   - ☐ Bid Wanteds        ☐ Situation offerings
   - ☐ Trades             ☐ Situation Bids
   - ☐ Auction Items

2. SET THE AMOUNT AND FRESHNESS. MAY BE LEFT BLANK FOR ANY AMOUNT.

|         | Min | Max |
   |---------|-----|-----|
   | Amount  |     |     |
   | Freshness | New today | |

3. ENTER CUSIPS TO BE MONITORED

CUSIPS may be typed in manually or pasted in a column.

4. ENTER A NAME AND CLICK SAVE/GO

Alert name [____] [Save/Go] [Delete]

CLICK HERE TO RESET

---

SELECT A SAVED ALERT TO MODIFY IT, DELETE IT OR TURN IT ON OR OFF.

[Saved Alerts ▼]  This Alert is [On ▼]

CLICK HERE TO SHOW MY LAST ALERTS

| sent | item | cusip | amount | description | coupon | mat | sharp firm | yld | prc | scale |
|---|---|---|---|---|---|---|---|---|---|---|
| 08:36 | Auction 546475DV3 | 235 | LOUISIANA ST GA | 5.000 | 05/2027 | 02:00 03:00 03:00 | 4.520-net | 102.752 | +0.240 |
| 08:36 | Auction 548101CNE6 | 105 | LOWER CO RIV AU | 4.500 | 05/2022 | 02:00 03:00 03:00 | 4.656-net | 99.290 | +0.356 |
| 08:36 | Auction 235218HE0 | 40 | DALLAS TX DALLA | 5.000 | 02/2020 | 02:00 03:00 03:00 | 4.500-net | 102.865 | +0.200 |
| 08:36 | Auction 661353E96 | 12360 | NORTH LAS VEGAS | 5.000 | 05/2030 | 02:00 03:00 03:00 | 4.520-net | 103.792 | +0.089 |
| 08:36 | Auction 235306G45 | 30 | DALLAS TX ISD S | 5.000 | 02/2023 | 02:00 03:00 03:00 | 4.556-net | 102.645 | +0.208 |
| 08:36 | Auction 745220E20 | 5 | PR GO INFRASTRU | 5.000 | 07/2041 | 02:00 03:00 03:00 | 4.996-net | 100.000 | +0.489 |
| 08:36 | Auction 590545LN7 | 500 | MESA ARIZ UTL | 2.250 | 07/2006 | 02:00 03:00 03:00 | 3.440-net | 99.878 | -0.140 |
| 08:36 | Auction 546279W55 | 365 | LOUISIANA LOC G | 4.375 | 03/2021 | 02:00 03:00 03:00 | 4.467-net | 99.007 | +0.216 |
| 08:36 | Auction 546279M6 | 2185 | LOUISIANA LOC G | 5.375 | 12/2019 | 02:00 03:00 03:00 | 4.300-net | 106.637 | +0.020 |
| 08:35 | Auction 585366H33 | 35 | MELBOURNE FL WT | 0.000 | 10/2019 | 02:00 03:00 03:00 | 4.597-net | 54.583 | +0.407 |
| 08:35 | Auction 051531B81 | 420 | AURARIA HIGHER | 4.400 | 04/2024 | 02:00 03:00 03:00 | 4.666-net | 98.790 | +0.356 |
| 08:34 | Auction 544495K49 | 10000 | LOS ANGELES CA | 5.000 | 07/2029 | 02:00 03:00 03:00 | 4.470-net | 103.822 | +0.040 |
| 08:34 | Auction 692634CB2 | 10 | OZARK MO REORG | 4.500 | 03/2026 | 02:00 03:00 03:00 | 4.372-net | 101.020 | +0.022 |

Securities Auction System Alert — 91, 92 (Pause Alerts), 93 (Turn Alerts Off)

FIG. 11

MY TRADES

PENDING TRADES | COMPLETED TRADES

| TRADE | ITEM | CUSIP | AMOUNT | DESCRIPTION | COUPON | MATURITY | YIELD | CONC | PRICE | NET | Scale | TIME ENTERED |
|---|---|---|---|---|---|---|---|---|---|---|---|---|
| 1 | Sell | 051531BR1 | 420 | AURARIA HIGHER ED CT | 4.400 | 04/01/2024 | 4.660 | 0.075 | 96.792 | 4.666 | +0.356 | 08:34:03 |
| 2 | Sell | 709222BD4 | 200 | PA TPK COM REGISTRAT | 5.000 | 07/15/2041 | 3.770 | NET | 106.518 | 3.770 | +0.100 | 08:49:45 |
| 3 | Sell | 516840SQ9 | 500 | LAREDO TX ISD BLDG U | 0.000 | 08/01/2025 | 5.115 | NET | 37.821 | 5.115 | +0.785 | 08:54:40 |
| 4 | Sell | 56643FES6 | 150 | MARICOPA CNTY ARIZ U | 4.000 | 07/01/2014 | 4.020 | 0.075 | 99.784 | 4.031 | +0.121 | 09:03:45 |
| 5 | Sell | 342815QB6 | 250 | FL ST MUN LN COUNCIL | 3.100 | 12/01/2008 | 3.850 | 0.060 | 98.156 | 3.876 | +0.266 | 09:09:16 |
| 6 | Sell | 608117DJ3 | 510 | MOHAVE CNTY ARIZ UN | 4.250 | 07/01/2013 | 3.850 | 0.035 | 102.421 | 3.856 | +0.036 | 09:15:38 |
| 7 | Sell | 138010PZ0 | 100 | CANON MCMILLAN S/D P | 0.000 | 12/01/2025 | 4.807 | NET | 39.574 | 4.807 | +0.477 | 09:36:16 |
| 8 | Sell | 574192VG2 | 500 | MD ST & LOC FAC LN-S | 5.000 | 08/01/2012 | 3.740 | 0.060 | 106.833 | 3.751 | +0.021 | 09:41:02 |
| 9 | Sell | 843146V24 | 1155 | SOUTHERN IL UNIV RFD | 5.000 | 04/01/2022 | 4.480 | 0.060 | 104.039 | 4.487 | +0.217 | 09:48:46 |
| 10 | Sell | 64966DWX3 | 450 | NYC RFDG-SER G UT | 5.000 | 12/01/2019 | 4.430 | 0.060 | 103.946 | 4.438 | +0.258 | 09:54:39 |
| 11 | Sell | 602366DL7 | 775 | MILWAUKEE WI CORP PU | 4.250 | 02/15/2020 | 4.570 | NET | 96.758 | 4.570 | +0.350 | 09:55:40 |
| 12 | Sell | 13067JAY7 | 500 | CA ECONOMIC RECOVERY | 5.000 | 07/01/2012 | 3.780 | 0.055 | 106.532 | 3.790 | +0.060 | 10:07:50 |
| 13 | Sell | 649716CE5 | 50 | NYC TFA FUTURE TAX S | 4.750 | 11/15/2023 | 4.600 | 0.125 | 100.412 | 4.635 | +0.345 | 10:15:47 |
| 14 | Buy | 68641HBP8 | 3000 | ORLANDO FL CAP IMPT | 4.750 | 10/01/2022 | 4.585 | 0.150 | 100.351 | 4.634 | +0.364 | 10:27:07 |
| 15 | Buy | 681793W84 | 390 | OMAHA PUB PWR DIST N | 4.650 | 02/01/2030 | 4.795 | 0.125 | 97.829 | 4.804 | +0.354 | 10:28:12 |

FIG. 12

MY BIDS

| STATUS | POS | ITEM | CUSIP | AMT | DESCRIPTION | COUPON | MATURITY | YIELD | CONC | PRICE | NET | Scale | TIME |
|---|---|---|---|---|---|---|---|---|---|---|---|---|---|
| TRD | 1 | 4030 | 056559AM9 | 230 | BADGER TOB ASSET | 6.375 | 6/1/2032 | 4.99 | 0.125 | 106.781 | 5.014 | 0.594 | 13:32:40 |
| TRD | 3 | 6004 | 399307JX6 | 375 | GROTON-DUNSTABL | 4.125 | 8/1/2013 | 3.78 | 0.375 | 101.722 | 3.841 | 0.061 | 14:06:08 |
| TRD | 4 | 25006 | 709141LE3 | 25 | PA SECOND SERIE | 5.25 | 10/1/2009 | 3.8 | 0.8 | 103.458 | 4.066 | 0.436 | 12:53:06 |
| TRD | 6 | 25008 | 165573JQ0 | 25 | CHESTER CNTY PA | 5.5 | 11/1/2006 | 3.63 | 0.7 | 99.715 | 6.656 | 3.046 | 12:53:20 |
| TRD | 12 | 25004 | 707483FT5 | 25 | PENN HILLS PA RFD | 5.85 | 12/1/2014 | 3.798 | NET | 102.6 | 3.798 | -0.052 | 12:59:41 |
| TRD | 8 | 4033 | 888808AT9 | 10 | TOBACCO SETTLEM | 6.125 | 6/1/2042 | 5.384 | NET | 103.65 | 5.384 | 0.944 | 13:33:26 |
| TRD | 1 | 4034 | 888809AC4 | 30 | TOBACCO SETTLEM | 6.25 | 6/1/2042 | 5.24 | 0.5 | 104.496 | 5.338 | 0.898 | 13:33:38 |
| PEND | 1 | 25005 | 659868HW6 | 25 | NORTH HILLS PA S/D | 5.5 | 11/15/2012 | 3.46 | 0.97 | 101.536 | 4.239 | 0.629 | 13:03:48 |
| PEND | 5 | 4035 | 3812NAJ1 | 10 | GOLDEN ST TOB SE | 4 | 6/1/2010 | 4.67 | 1.5 | 96.178 | 5.114 | 1.464 | 13:33:58 |
| PEND | 6 | 5007 | 13077CHU1 | 15 | CA UNIV RFDG SER | 5 | 11/1/2023 | 4.3 | 2.4 | 102.88 | 4.612 | 0.372 | 13:35:25 |
| PEND | 5 | 25007 | 118565PE4 | 25 | BUCKS CNTY PA UT | 5.5 | 12/1/2010 | 3.46 | 0.98 | 101.612 | 4.221 | 0.611 | 13:03:58 |
| PEND | 1 | 5010 | 442330T48 | 20 | HOUSTON TX RFDG | 5.375 | 3/1/2012 | 3.85 | 2 | 104.324 | 4.32 | 0.61 | 14:27:47 |
| PEND | 3 | 8001 | 954872JC2 | 375 | WEST ORANGE NJ | 4.35 | 7/15/2020 | 4.15 | 0.375 | 101.237 | 4.196 | 0.056 | 13:04:57 |
| N/T | 4 | 5011 | 235308GA5 | 25 | DALLAS TX ISD SCH | 5 | 2/15/2023 | 4.496 | 0.5 | 102.684 | 4.574 | 0.334 | 14:28:15 |
| N/T | 1 | 5008 | 6500PAK0 | 20 | NY URBAN DEV CO | 5 | 1/1/2017 | 4 | 2.17 | 101.821 | 4.537 | 0.867 | 13:35:33 |

FIG. 13

MY ITEMS

| STATUS | ITEM | CUSIP | AMT | DESCRIPTION | COUPON | MATURITY | YIELD | CONC | PRICE | NET | Scale | TIME |
|---|---|---|---|---|---|---|---|---|---|---|---|---|
| TRD | 27029 | 655857BT6 | 10 | NORFOLK VA ARPT | 5.125 | 7/1/2031 | 0 | NET | 100.01 | 0 | -4.41 | 13:19:57 |
| TRD | 4018 | 845530AA2 | 30 | SOUTHWESTERN IL | 5 | 2/1/2028 | 5.088 | NET | 98.86 | 5.088 | 0.738 | 13:24:44 |
| TRD | 4019 | 681793W43 | 365 | OMAHA PUB PWR | 4.55 | 2/1/2025 | 4.64 | 0.125 | 98.765 | 4.65 | 0.36 | 13:24:49 |
| TRD | 4022 | 263309LK0 | 115 | DU PAGE CNTY IL | 4.625 | 10/1/2025 | 4.634 | NET | 99.876 | 4.634 | 0.344 | 13:24:55 |
| TRD | 4024 | 850527GY2 | 50 | SPRINGFIELD IL SER | 5.25 | 12/1/2010 | 4.352 | NET | 101.951 | 4.352 | 0.702 | 13:30:48 |
| PEND | 27023 | 13078ALM7 | 40 | CA STATEWIDE CM | 2.9 | 10/1/2010 | 3.85 | 0.975 | 95.412 | 4.114 | 0.464 | 13:48:00 |
| PEND | 27020 | 671205XG2 | 100 | OAK GROVE CA S/D | 3.4 | 8/1/2013 | 3.917 | 0.1 | 96.768 | 3.366 | -0.414 | 13:48:06 |
| PEND | 27054 | 544525AM0 | 50 | LOS ANGELES CA | 5 | 10/15/2016 | -0.314 | NET | 103.252 | -0.314 | -4.274 | 13:59:03 |
| N/T | 6009 | 745145BG6 | 50 | PR GO RFDG-PUB | 5.5 | 7/1/2012 | 3.75 | 0.76 | 108.417 | 3.888 | 0.178 | 14:02:23 |
| N/T | 4040 | 056659AH0 | 25 | BADGER TOB ASSET | 5.75 | 6/1/2012 | 4.75 | 2 | 103.02 | 5.141 | 1.431 | 14:37:33 |
| OFR | 531575NT1 | | 300 | LIBERTYVILLE IL WTR | 4.2 | 5/1/2020 | 4.22 | 0.325 | 99.462 | 4.252 | 0.112 | 14:02:45 |
| N/T | 8007 | 5386024B6 | 45 | LIVINGSTON CNTY MI | 4 | 5/1/2014 | 3.9 | 1.16 | 99.497 | 4.076 | 0.226 | 14:28:59 |
| N/T | 8005 | 5386024A8 | 15 | LIVINGSTON CNTY MI | 4 | 5/1/2013 | 3.85 | 2.14 | 98.737 | 4.217 | 0.437 | 14:28:37 |

FIG. 14

SECURITIES AUCTION SYSTEM AND METHOD

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

The present invention pertains to a method and system for trading financial securities or instruments, and more specifically to the web based solicitation, collection and transparent real time dissemination of bids on specific lots of securities.

Traditional methods of trading securities vary among the types traded. Most common is the two-sided market or quoted market. With this method market makers express a bid and or offer side on a specific security. That market is then disseminated electronically, verbally or in print to other interested parties who may add to or act upon the market. This method of trading works well in actively traded securities such as equities or US Treasuries. There are other less actively traded securities markets where the liquidity required for this method to be effective is not readily available. Those markets have developed alternative methods of trading.

In the US municipal bond market, there are in excess of 1,200,000 unique securities outstanding, each identified by a CUSIP number, comprising obligations of approximately 50,000 issuers. CUSIP is the acronym for Committee on Uniform Securities Identification Procedures. On average approximately 17,000 unique securities trade daily. Due to market supply and demand those may vary on a daily basis. It is not feasible to expect active markets on all municipal securities. In response to this circumstance the US municipal bond market employs two additional methods of trading.

Dealers and brokers compile lists of offerings on lots of bonds that are available for purchase at a specified price. They disseminate these lists verbally, in print or electronically to other market participants, who in turn may enter into negotiation to purchase all or part of said lot. These lists are commonly referred to as offering lists or offering runs. They are available on various trading platforms and from information service providers as well as being distributed verbally and by e-mail.

The second additional method of trading employed in the US municipal bond market is "Bid Wanted". Prior art for this method can be traced back to 1949 with the formation of J.J. Kenny & Co. a municipal securities broker's broker. In this process the potential seller will solicit a bid through a "broker's broker" [inter-dealer broker or "IDB"]. To protect the anonymity of parties involved the broker conducts the process acting as an agent on an undisclosed basis. The seller maintains the right to determine if the bonds will trade. This method may be carried out verbally, electronically or via a hybrid method combining voice and electronic trading. In this process bids are only disclosed to the seller.

Legal and regulatory requirements imposed by the NASD and the SEC seek "best price" execution and more open methods of trading. In markets where obtaining the "best price" for securities that may be inactive or infrequently traded, this presents a unique challenge.

The availability of market data alone does not ensure transparency. The open dissemination of this data is a demanding task of it's own. Obtaining dynamic updating of securities markets on a computer requires the use of a dedicated terminal or of a program installed on the end user's computer. Dedicated terminals are expensive and take up valuable desktop space. The use of a program has several inherent problems evident in the areas of connectivity and network security. In many cases there are changes required to the end users network infrastructure and or security policies for the program to work properly. The use of client side software also presents the problem of maintenance. Upgrades or modifications to the program require users to re-install or update the software residing on the client, a time consuming and therefore expensive process. U.S. Pat. No. 6,876,309 issued Apr. 5, 2005 to David Lawrence discloses a computer implemented bond trading system for a private electronic auction conducted by a broker between multiple bidders and a seller whose identity is undisclosed. Although the broker's computer system receives the bids and determines the high bid, the bids are not disclosed to the various bidders or participants, and there is no provision for automatically updating the bids on a computer screen visible to all bidders in real time as the auction proceeds.

BRIEF SUMMARY OF THE INVENTION

It is an object of this invention to provide a novel method and system for trading securities that address legal and regulatory requirements while permitting easy, open, dynamic access to the system and the data derived from it. Another object of the present invention is to provide a novel and improved system for trading securities, which may use electronic, computer, Internet and web media procedures, components, and systems readily available in the market.

With the application of web based technologies such as remote scripting and "AJAX" [asynchronous java script and XML] a combination of web technologies that provides for the dynamic update of web page content, the present invention provides a price transparent dynamic securities auction system which can be implemented on a web site for use in the securities markets. This method provides an auction where all bids are displayed and accessible to all bidders as the auction proceeds so that a bidder has knowledge of competing bids to help decide when and how much to bid, if at all, during the auction. Additionally, in accordance with the present invention, the bids are automatically updated on a real time basis as the auction proceeds. Thus the method and system of the present invention improves the knowledge and transparency of an electronic securities auction and effectively eliminates network, connectivity and maintenance problems encountered with prior methods, creating a novel and innovative trading method and system previously unknown.

Access to the system requires no special software. The client side requires a standard JavaScript enabled web browser such as Internet Explorer, Firefox or Netscape to provide dynamic data transfers between the system and the end user. The databases and programs utilized by the system reside on a host computer network accessed by users over a connection established via the Internet or a dedicated private circuit. An individual login permitting only single sign on is required and all data transfer is encrypted.

Once logged on a user may search the database of available auction items by various criteria specific to the type of security traded. Bids associated with each auction item are displayed on a results screen and updated dynamically while a bidder, seller or other participant views the page. The user may enter items for auction by means of a web form on which they provide an amount, CUSIP, or other unique identifying number, a time for the auction deadline time [sharp time] and a time by which the determination of trade will be made by the seller [firm time]. They may also enter bids on auction items by means of another web form that provides detailed information pertaining to the security for auction and the specifics of the particular auction. This form is referred to as the "Auction Detail". In another embodiment of the present invention, the auction is conducted under the condition that the highest bidder at the auction deadline time buys the securities at the highest price bid. Provided that the price is equal to or greater than a predetermined will trade price that is set by the seller at the time the auction item is submitted. In other words, a trade is deemed to have occurred with the highest bidder existing as of the auction deadline time provided that the will trade price has been reached.

The system includes a user configurable alert feature that provides users with real-time notification of system activity along with dynamic updates as to the status of auction items the user may be looking to sell or buy. Each alert contains a link to the "Auction Detail" for the item where all bids are visible and dynamically updated. The "Auction Detail" also contains links to historical trade, auction and offering data on the security up for auction. The openness of the bidding process, specifically the ability to view all bids while the auction is in progress is a unique and novel aspect of the system.

In most instances the operator of the securities auction system of the present invention would be required to be registered as a broker dealer who complies with regulation ATS or as an exchange with the SEC The operator of the Securities Auction System will act as a contra party on all trades to both seller and buyer. All users remain anonymous thus protecting their market activity from other competitive participants while all prices are visible enhancing the transparent aspect of the system.

Execution of a trade which is at the discretion of the Seller, may take place electronically via a direct link to the seller or buyer's operations system making use of straight through processing [STP] or verbally through the operators trading desk. Other objects and advantages of the present invention will become apparent from the following more detailed description taken in conjunction with the attached drawings.

BRIEF DESCRIPTION OF THE DRAWINGS

FIG. 2 is a view of the Auction Entry Screen. This screen provides a form on which users may submit requests for bids on auction items.

FIG. 3 is a view of the Auction Entry Confirmation Screen. This screen provides the seller of an auction item the ability to verify the description and specifications of the item before final submission. The screen also shows matching bonds available in other parts of the "complete trading system" if applicable.

FIG. 4 is a view of the Auction Search Screen. This screen provides the user with the interface to search the database of current auction items by specific criteria relevant to the type of security or item up for auction. The example is specific to municipal bonds. The search criteria on the screen would vary according to the specific features of the type of security. The screen also provides options for the format in which the results are displayed.

FIG. 5 is an example of the results presented from the Auction Search Screen. The result screen presented is the preferred default format specific to municipal bonds. There would be multiple formats available depending on user preference. All results screen formats would contain descriptive information and the current high bid or trade price. The high bid will update dynamically when a new high bid is submitted.

FIG. 6 is a view of an Auction Detail. This screen shows all the information pertinent to the auction item including all bids made on the item time stamped and listed in order dynamically updated. It provides links to other available functions and the form on which a bidder may submit a bid. The seller may also submit sell orders from this screen.

FIG. 7 is a view of the History available from a link on the Auction Detail. This is historical data derived from the system or the "complete trading system", if applicable, on the specific auction item. The data contains all bids, offerings, bid Wanted and Auction Items entered or transacted on the system for the specific security.

FIG. 8 is a view of the Calculator available from a link on the Auction Detail and from a link on the price of each item on the results page. The calculator performs up to 20 calculations at once and provides links to additional data on sinking fund and call schedules for each security. The example is specific to municipal bonds.

FIG. 9 is a view of the Program Alerts Screen. This screen provides the interface for the user to program the system using specific criteria to deliver notification of system activity.

FIG. 10 is a view of the Portfolio Monitor Alert Screen. This screen provides an alternate interface for the user to program alerts. It is designed to permit monitoring the system for activity on a specific portfolio by either CUSIP or other identifying number.

FIG. 11 is a view of the Alerts Pop-up Screen. It displays information corresponding to alerts programmed in the Program Alert Screen or the Portfolio Monitor Alert Screen as well as system generated alerts pertaining to the users activity.

FIG. 12 is a view of the My Trade's Recap Screen. This screen displays a users trade activity for the day.

FIG. 13 is a view of the My Bid's Recap Screen. This screen displays a users bid activity for the day.

FIG. 14 is a view of the My Item's Recap Screen. This screen displays a users Auction requests for the day.

DETAILED DESCRIPTION OF THE INVENTION

Figure 1:
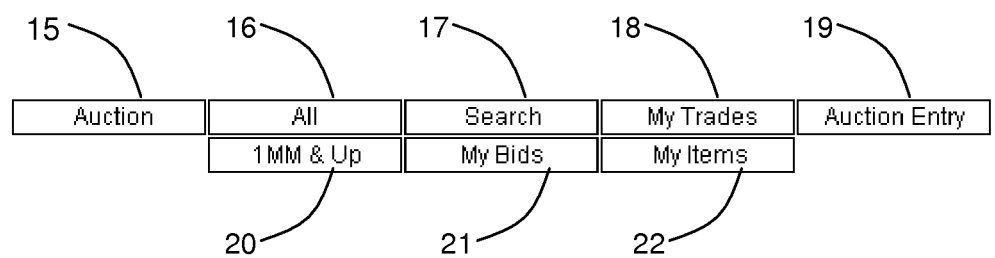
FIG. 1 is a view of the navigation structure of the system

Referring to the drawings in detail there is shown for illustrative purposes only a securities auction system in accordance with preferred embodiments of the present invention which leverages current web based technologies to provide for the dynamic update of content within a web page to achieve transparent trading and best price execution in the market place. Although the present invention is particularly useful in the secondary US municipal securities market, the invention may be adapted to virtually any type of financial instrument or security. The invention is particularly useful for trading in over-the-counter markets or in inactively traded securities where obtaining the best price for the security may present a difficult challenge. The preferred embodiment described herein pertains to the U.S. municipal securities market but it will be apparent that the present invention may be applied to other markets both domestic and foreign.

The system includes databases and programs that reside on a host computer network having one or more servers and other standard network apparatus (henceforth referred to as the server side) and various web pages that contain static and dynamic HTML and scripts that are accessed by users with a standard java-script enabled web browser on a computer via the internet or through a proprietary direct connection (henceforth referred to as the client side). No additional software downloads or installs are required on the client side. Dynamic update of content on the client side is accomplished with remote scripting, a process where a script contained in the client web page initiates a connection to the server side to receive a file that is created by a program on the server side that contains updated data relevant to the specific component of the client web page. That specific component is then updated without refreshing or reloading the entire web page. As new technologies and methods emerge in web design and programming the operator will take advantage of them to improve performance of the system.

The Securities Auction System of the present invention is intended to operate as an Exchange or Alternative Trading System (ATS) registered with the Securities Exchange Commission (SEC). It may also function as a stand-alone system or be part of a "complete trading system" implemented by an operator. The system may be used to trade in a fully electronic fashion or in a hybrid method, which uses a combination of electronic trading and traditional voice brokering. The graphic user interfaces (GUI) described herein provide access to insert and update the databases and to view the data in the system. Alternately, a user of the system may receive data and make inserts or updates by means of a direct data feed with the system. This method may be preferred by some securities dealers or sophisticated investors who utilize proprietary trading systems to aggregate market data. Regardless of the method, all inserts and updates to the database are recorded in a log file to provide a permanent record of activity in the system.

Access to the securities auction system is accomplished by navigating to a web site where a username and password are entered. The login is restricted to a single concurrent sign in. If access is attempted from a second location using the same username and password it is denied. Data transfer between the server and client is encrypted using Secure Sockets Layer (SSL) encryption.

Navigation of the system is accomplished from a menu on a web page that is displayed after login. Referring to FIG. 1, in one embodiment of the securities auction system where the invention is implemented as a stand-alone trading system the only button or link to appear may be the Auction button 15. The other buttons 16 thru 22 would appear as drop down or expanded menu options from Auction button 15. The All button 16 initiates a search of the database for all Auction Items for the day. Search button 17 links to a web page with the Auction Search Screen (FIG. 4). My Trades Button 18 initiates a search for all trades executed by the logged in user during the current trading session and returns results as displayed in (FIG. 12). Auction Entry button 19 links to a web page with the Auction Entry Screen (FIG. 2). 1 MM & Up button 20 initiates a search of the database for all Auction Items for the day with a par value of $1,000,000 or more. My Bids button 21 initiates a search for all bids made by the logged in user during the current trading session and returns results as displayed in (FIG. 13). My Items button 22 initiates a search for all Auction Items entered by the logged in user during the current trading session and returns results as displayed in (FIG. 14). The functions the buttons initiate or the web pages they link to may vary depending upon the embodiment of the system. For example if the system were implemented in Emerging markets there may be a button labeled "Argentina" that would initiate a search of the database for the current list of available auction items for securities that were issued by the country of Argentina. The function of other optional buttons would be apparent to those skilled in the art of the particular securities market that the system was implemented in.

Bid requests for auction items may be entered using the Auction Entry Screen (FIG. 2). The fields listed are required fields for municipal bonds and may vary depending upon the type of security the system is used to trade. To request a bid from the system enter a CUSIP for the security in the CUSIP field 23 and an amount that represents the par value of the item you are submitting in the Amt field 24. Amounts are entered in terms of thousands for example 100 represents $100,000.00 in par value of bonds. Select a Sharp time from the drop down menu 25. This is the time the auction will close and all bidding will be cut off. Select a firm time from the appropriate drop down menu 26. This is the time bids will be considered released. The seller has until the firm time to determine if the securities will trade. All bids are considered firm until the firm time is reached. It is the bidders option to accept or decline any trade request submitted after the firm time. Special Settlement field 27 is to specify a non-regular settlement date for the auction item. Regular settlement for municipal bonds is trade date plus 3 days and will be assumed if this field is left blank unless the security is WI (When Issue), which will be discussed latter. Dollar Bids only field 28 is to be used by the seller to restrict bidding to bids entered in a dollar price format. With this field checked yield based bids will not be accepted by the system. This is common practice for pre-refunded bonds where there may be defeased calls prior to the refunding date or for securities that do not accrue interest such as a bond that is in default. When the form is complete click on the Submit button 27 on top of the page. The account name or firm that the logged in user represents is displayed on the top of the form 29.

Upon submission of the Auction Entry Form a program on the server side creates a description for each security for which a bid is being requested. The system maintains a CUSIP master database that contains complete descriptive data on all municipal securities. This database, which is licensed from an information vendor is stored on the host network and is updated daily or on an intra-day basis, depending on the provider and the license purchased. When an auction item is inserted into the system, specified data fields are retrieved from the CUSIP master database and are stored in a daily CUSIP table. The Auction entry program checks this table first for the CUSIP record. If a record is found it is checked against the CUSIP master. If any differences are found a choice is provided to the user as to which description to utilize. If no record is found in the daily CUSIP table, the CUSIP master is referenced. This is done to enhance the performance of the auction entry process, ensure consistent descriptions and utilize the most current available descriptive data. An auction item is then created. Relevant data components are stored in the auction table and a unique identifying reference number is assigned to the item. Upon completion of this process the auction confirmation screen (FIG. 3) is returned.

The auction confirmation screen (FIG. 3) provides for review of the auction specifics and descriptive data prior to final insert of the item. Referring to FIG. 3, the description of the auction item 31 is displayed. It contains elements deemed important in determining the value of the security arranged in a format that one familiar with the specific securities market would easily interpret. To ensure the validity of the description the user may not modify it. Occasionally errors in the source data occur. In such instances, with consultation and consent from the listing client, the operator of the system using an administrative function may modify descriptive data. The particulars of the auction item 32 may be modified on the client side. The CUSIP master contains a When Issued indicator. The WI check box 33 will be appropriately marked automatically by the system if the securities are When Issued. This is the one data field derived from the CUSIP record the client may modify. Upon satisfactory review of the item check the Submit check box 34 and click the submit button 36 to enter the item. To cancel submission check the Cancel check box 35 and click the submit button 36. The auction entry program also performs a search of the system or the complete trading system if applicable for matching securities by CUSIP. If found they are displayed on the auction review screen. The amount, yield, concession, price and type of item are shown 37. In this example the matching bonds are an offering found in the complete trading system.

Searching for auction items in the system is accomplished with the Auction Search Screen (FIG. 4). Using this screen you may also create, save, modify or delete searches. The fields contained in the criteria section 38 of the search screen, where not self-explanatory are evident to those familiar with the type of security traded. To perform a search enter the desired criteria and click the Go button 41. To save a search enter the desired criteria along with a name for the search in the Search name field 40 then click the Save button 42. To retrieve a saved search, select it from the Saved Searches drop down menu 39. Once retrieved to execute the search click the Go button 41. To delete the search click the Delete button 44. To modify a search first retrieve it using the Saved search dropdown menu 39, make the desired changes to the search criteria 38 in the appropriate fields and click the Save Button 42. The newly selected criteria will overwrite the criteria of the existing search. The Reset button 43 will blank the entire form.

Upon submission of the search criteria the database is queried and results are returned on the results screen (FIG. 5). There may be multiple result formats available depending on the securities traded and the preferences of the user. These alternate result formats may be viewed by clicking on the links 49 on the results page, however the results will always contain certain elements and will be updated dynamically without a page refresh as new auction items that match the criteria are submitted to the system. Along with the security description, which may vary in detail, each item displays the current status of the auction 45 updated dynamically. In the example "N/T" indicates no trade. No status indicates the item is open for bidding and "TRD" indicates the item has traded. Results are also color coded to indicate different status. The reference or item number 46 is also displayed for every item. The CUSIP 47 is always displayed and provides a link to the Auction Detail screen (FIG. 6). The current high bid 48 is displayed for each item and dynamically updated as new bids are entered into the system. The display of the high bids and the dynamic updating of bids along with certain other data elements of the results page are novel features of the securities auction system of the present invention.

The Auction Detail screen (FIG. 6) brings all the data relevant to a single item together. As previously noted the screen is accessed by a link from the CUSIP on the results screen. The series of buttons along the top of the screen 50 thru 54 provide links to additional data. Previous button 50 and Next button 51 displays the previous or next item detail in the search results. TBMA button 52 provides a link to "The Investing in Bonds" web site where the MSRB (Municipal Securities Rule-making Board) trade history for the specific security is displayed. The History button 53 displays historical data (FIG. 7) derived from the auction system or the complete trading system, if applicable, on activity for the specific security such as a bid, offering, market or prior Auction item that may or may not have traded. Data retrieved here is proprietary to the system and may not be available from any other source. Calculator button 54 links to the securities calculator (FIG. 8) preloaded with the description and elements of the specific security. The particulars of the auction item 55 are listed next. The data displayed here is clearly labeled. The status of an item may be updated from the Trade Status drop down menu 56. The options available are Pending, No Trade, Sold or Traded Away. The later indicates the securities traded away from the auction system and are no longer available. This status may only be updated by the listing client who accomplishes this by selecting a status from the Trade Status drop down menu 56 then clicking on the Update button 57. When an item has been marked Sold the trade Status Drop down Menu automatically adjusts and may not be modified. A message is sent to the high bidder, via the alert system, to notify them of their purchase. As discussed earlier all bids are firm until the firm time. A condition of bidding on an auction item obligates the high bidder to accept the trade up to the firm time. Trades may be executed after said time through the operators trading desk. A concise description of the security 58 is included on the auction detail. It contains data elements deemed relevant to the pricing of the security. In this embodiment the detail displays independent price evaluations 59 from two sources. This data is for information only and is intended to aid a bidder in setting their bid price. It is an independent parties appraisal of the value of the security. This data is available at a fee from the provider and requires a license for re-distribution. The bid display (60) lists all bids in high to low order. Yield and concession bids are converted to price and net yield; price bids are converted to net yield. Each bid is time stamped with the time the bid was entered. In the event of a tie high bid the first bid entered will be considered the high bid. The Scale column 61 indicates the spread of the net yield of each bid to a bellwether yield curve for the market such as MMD, MMA or S&P yield curves in the municipal market.

Bids are entered on the bottom of The Auction Detail screen (FIG. 6). Bids may be entered in yield, yield and concession or price. A bid may be submitted by entering a Yield with or without concession or a price in Bid row 62 then clicking the submit button 68. A bid entered here must be greater than or equal to the current high bid plus the Bid Price Increment 67. The Bid Price Increment 67 is set by the system when the item is inserted. It is dictated by the par value and maturity of the item with shorter maturities and larger amounts having smaller bid price increments. A bid may be increased at any time but may not be lowered or withdrawn without good cause. The system administrator only may lower or withdraw a bid. A bidder may specify a bid is flat 64 (calculated without accrued interest) or may submit a "Will Bid" 65 to indicate an interest in bidding the item at a later time or a "Pass" 66, to indicate no interest in bidding the item, by checking the appropriately labeled check box. If "Will Bid" 65 is selected the system will send an alert to the potential bidder 10 minutes prior to the Sharp time for the item. When entering a bid in Auto Bid Up To row 63 the system will automatically insert a bid equal to the current high bid plus the Bid Price Increment 67 not exceeding the level entered, and thereafter automatically increase your bid, any time it is topped out, by the Bid Price Increment 67 or multiples thereof until it is high, not exceeding the Auto Bid Up To level. The Bid 62 and Auto Bid Up To 63 fields may be used in conjunction to enter an initial bid at a level greater than the current high bid, plus the Bid Price Increment 67 that will be increased up to the Auto Bid Up To level by the Bid Price Increment or multiples thereof when necessary to top out another bid, not exceeding the Auto Bid Up To level. The Auto Bid Up To level is considered confidential and not displayed to other participants in the auction.

As previously noted the system contains dynamically updated components. Certain data on viewed pages updates in real time. The prices and auction status on the detail are among those elements. The program used to accomplish this is the "Alerts" program. When a client loads a page that contains a dynamically updated component a script in that page sends a message to the alert program on the server side subscribing to updates to those specific elements. This program is also used to send round up messages (described above in paragraph 41), trade messages or other messages, which may be triggered by client activity or automatically generated by the system, to the client. Additionally there are two graphic user interfaces (GUI's); the program alerts screen (FIG. 9) and the portfolio monitor alert (FIG. 10) provided for this program that permit the client to configure alerts to monitor specific activity in the securities auction system or the complete trading system.

The program alerts screen (FIG. 9) provides an interface for the user to configure, save and modify alerts that monitor system activity. The criteria fields 69 are similar to the criteria fields 38 on the auction search screen (FIG. 4). Where not self-explanatory the criteria are evident to those familiar with the type of security traded. To configure and save an alert select the type of activity you wish to monitor in the top row 70 in the criteria section 69. The types of activities available here may vary with the type of security traded. Then specify the criteria for the data elements of the securities to be monitored in the criteria section 69. This section of the screen contains a CUSIP List field 71 into which you may type or paste a list of up to 5000 CUSIPs to be monitored. Next enter a name for the alert in the Alert name field 75 and click the Save/Go button 76. The Reset button 77 will blank the entire form. To modify a saved alert select it from the saved alert dropdown menu 74. When retrieved the criteria of the alert will fill in the form where it may be modified. When modified the changes may be saved by clicking on the Save/Go button 76. To delete a saved alert select it from the Saved Alerts dropdown menu 74 then click the delete button 78. Individual alerts may be turned on or off by retrieving the alert from the Saved Alert drop down menu 74 then setting the "This Alert is" dropdown menu 72 to the desired option. The alert program may be deactivated for the signed on user by selecting the "turned off" option from the "Alerts are" dropdown menu 73. This option will turn off client configured alerts but not the updating of dynamic content within the system. The Alert popup screen (FIG. 11) may be retrieved by clicking on the "Show my last alerts" link 79.

Figure 9:
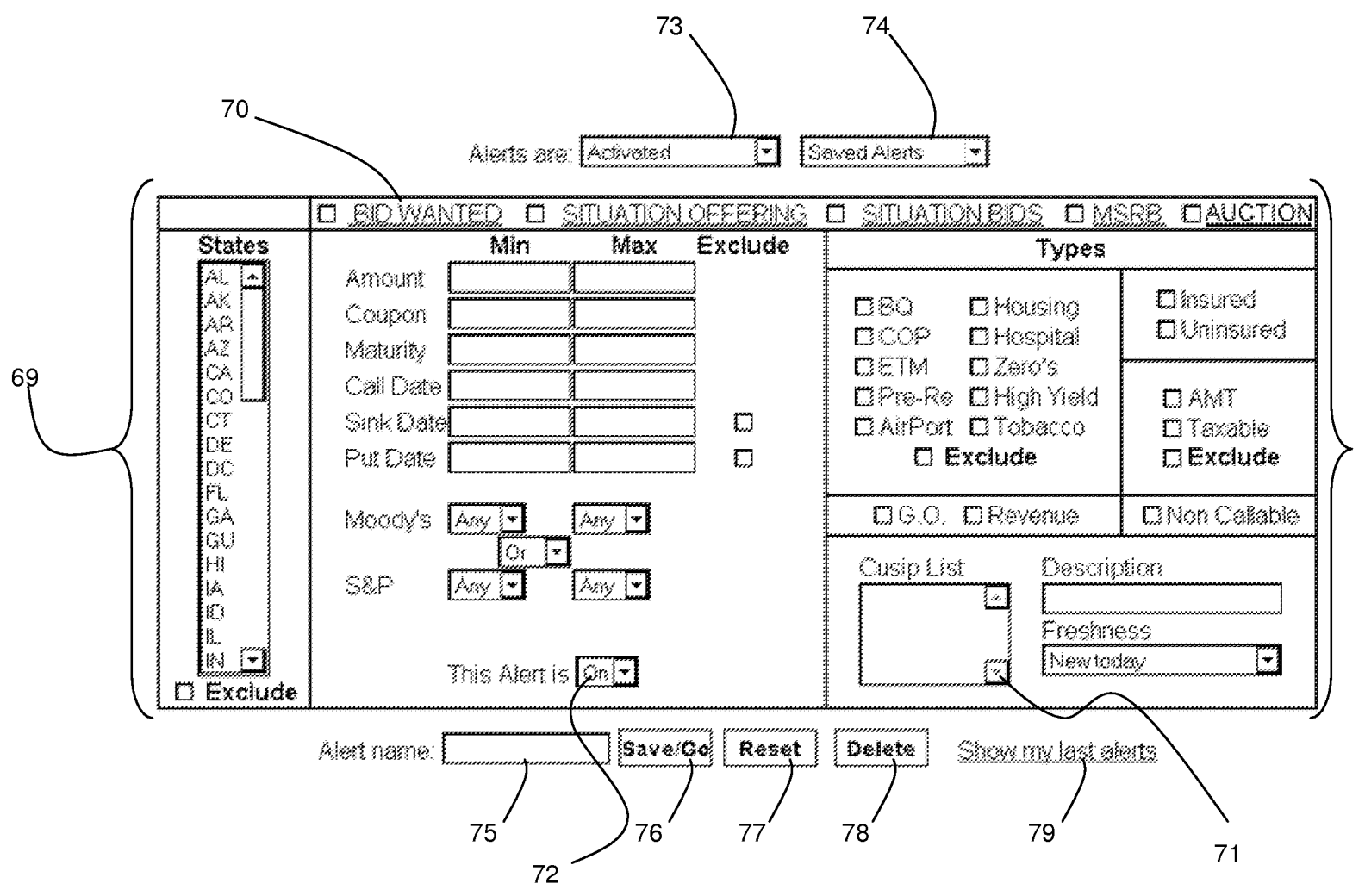

The Portfolio Monitor Alert screen (FIG. 10) contains selective functionality from the program your alerts screen (FIG. 9). It is designed to provide a condensed method for the client to configure alerts to monitor system activity for a specific portfolio defined by CUSIP. Instructions to use the screen are visible on the form. 1-Select the activities you wish to monitor 80. 2-Set the amount 81 and freshness 82. 3-Enter CUSIPS 83. 4-Enter a name 84 and click Save/Go 85. Alerts may be modified or deleted by retrieving the alert from the Saved Alerts dropdown menu 88. Make the desired changes then click Save/Go 85 or to delete click the delete button 86.

Once retrieved an individual alert may be turned on or off by selecting the desired option from the "This Alert is" dropdown menu 89. To retrieve the Alert popup screen (FIG. 11) click on the "Click here to show my last alerts" link 90 on the bottom of the form.

In the described embodiment of the present invention Alerts are presented in a popup window (FIG. 11). When an event that matches the desired user configured criteria or a system-generated event directed to the client occurs a window that contains a message will popup on the client side. These alerts notify the client of new items entered into the system or a change in status of items they have bid on or entered a "Will Bid" on as well as updates to bids on items they have submitted for auction. The alert system also provides a method to monitor overall market activity through a data feed provided by the MSRB (Municipal Securities Rulemaking Board) of reported trades in the municipal securities market. The CUSIP number 91 is a link to the Auction Detail (FIG. 6) for the item. The Alert Screen may be left open in which case it will behave like a vertical ticker with the most recent alerts appearing at the top of the screen scrolling down, as new ones are received. If the alert screen is closed it will popup again when a new alert is received. The Pause Alert button 92 on the top of the alert screen will stop the screen from updating. This feature is useful during times of heavy market activity where the number of alerts may be too great to follow effectively. Alerts may be resumed by clicking on the button a second time. When resumed all alerts you would have received during the pause will be sent. Clicking on the Turn Alerts Off button 93 will turn off alerts. To turn alerts back on you must use the Alerts are activated dropdown menu 73 on the program alerts screen (FIG. 9). In an alternate embodiment alerts may be presented in a frame on a web page. The frame may fill part of the page or may be hidden or expanded to fill the entire page. With the addition of a GUI to provide clients a free form field into which text may be entered the alert system may be utilized as an instant message system between logged-in clients.

The following is a summary of one example of an auction from start to finish. A securities dealer or other authorized customer of the operator of the Securities Auction System who desires to sell a block of securities, at a market price yet to be determined, would access the operators web site and using the navigation structure (FIG. 1) click on the Auction Entry button (19) to access the auction entry screen (FIG. 2) The potential seller then enters the CUSIP of the securities in the CUSIP Field (23), the par value of the lot in the Amount Field (24) and selects a Sharp Time, the time at which bids are due and further bidding on the auction will be closed, from the Sharp drop down (25), and a Firm Time, the time till which all bids are considered firm, from the Firm drop down (26). If the seller requires a special settlement date it is entered into the special Settlement field (27). If the seller would like to request that bids be entered only in the dollar price format check the Dollar Bids Only check box (28). With this information completed the potential seller then clicks on the Submit button (30).

The next step in the auction entry process is to verify the data entered before final submission to the system. Upon clicking the Submit button (30) the Auction Entry Confirmation Screen (FIG. 3) is returned. The potential seller reviews the description of the security (31) and the parameters of the auction (32). When satisfied check the Submit check box (34) then click the Submit button (36). An auction item has been created and is available to potential bidders for review.

Potential bidders may become aware of an item of interest using several methods. They may conduct a manual search of auction items using the Auction Search Screen (FIG. 4) Enter the criteria for the characteristics of the securities in which you have interest in the criteria search fields (38) and click the Go button (41). Searches may be saved. To implement a saved search select it from the saved search drop down (39) and click the Go button (41). In either instance you will be presented with the Auction Search Results screen (FIG. 5). Alternately a potential bidder may become aware of an item of interest through the alert system.

Alerts are programmed on the Program Alerts Screen (FIG. 9) or the Portfolio Monitor Alert Screen (FIG. 10) and monitor the system for items of interest to the user. When an item, that matches the criteria of a pre-programmed alert, is entered into the system a message in the form of the Alerts Pop-up Screen (FIG. 11) is sent to the user.

By whatever means a potential bidder becomes aware of an Auction the bidding procedure is the same. The CUSIP (47) on the Auction Search Results screen (FIG. 5) and (91) on the Alerts Pop-up Screen (FIG. 11) is a link to the Auction Detail (FIG. 6). A bidder may enter a bid in the bid entry field (62) and click Submit button (68). A detailed description of the process is discussed above in paragraph [0041]. Other functionality of the detail screen is discussed above in paragraph [0040].

All parties, weather participating or not, may monitor the progress of the auction. At the sharp time a message is sent to the potential seller via the alert system that the auction has closed. The message contains a link to the Auction Detail (FIG. 6). The seller reviews the bids on the auction detail (FIG. 6) and decides to trade the securities by changing the trade status drop down (56) to Sold and clicking the update button (57). A message is then sent to the high bidder via the alert system that they have successfully won the auction and have purchased the securities.

Although a preferred embodiment of the present invention has been shown and described above, variations, adaptations and modifications of the present invention will become apparent to those skilled in the pertinent art but without departing from the scope of the present invention, which is indicated in the appended claims.

What I claim as my invention is:

1. A computer implemented method of conducting a secondary market securities auction, the method comprising:
   providing, a computerized system comprised of: (a) a plurality of client computers; (b) at least one host computer; (c) standard network apparatus; (d) at least one database; (e) a computer software application, for instructing said computerized system to perform the method, that is coded in a browser-supported programming language combined with a browser-rendered markup language and reliant on a common web browser to render said computer software application executable;
   providing, a plurality of graphic user interfaces for a plurality of participants in said secondary market securities auction to interact with said computer software application, wherein the plurality of participants comprises: bidders, sellers and observers of said secondary market securities auction;
   providing, an auction detail graphic user interface comprising: (a) a list of bids from the plurality of participants to purchase an individual specific lot of secondary market securities for which bids are sought by a potential seller thereof; (b) a time which bids are due; (c) a time bids are good until; (d) a description of the individual specific lot of secondary market securities for which bids are sought by the potential seller thereof; (e) a field indicating a current status of said secondary market securities auction; (f) links to calculations; (g) links to historical data; (h) forms for submitting bids; (i) forms for selling orders; wherein substantially all information relevant to said secondary market securities auction and forms to accomplish any of a permissible action by the participants are available;
   submitting into a database, using at least one of said plurality of client computers to access a first graphic user interface of said computer software application, the individual specific lots of secondary market securities for which bids are sought by a potential seller thereof;
   performing a search of said database, using at least one of said plurality of client computers to access a second graphic user interface, wherein criteria is selected by at least one of the plurality of participants to identify the individual specific lots of outstanding secondary market securities to trade;
   displaying results of the database search, using at least one of said plurality of client computers on a third graphic user interface of said computer software application;
   submitting bids for the individual specific lots of outstanding secondary market securities, using at least one of said plurality of client computers to access said auction detail graphic user interface;
   programmatically displaying immediately upon entry and dynamically updating for display on said auction detail graphic user interface, the bids for the individual specific lots of outstanding secondary market securities, such that the bids including a bid price thereof are available to be viewed by the participant immediately upon entry of the bids and throughout said secondary market securities auction;
   executing a trade at the potential seller's discretion on said auction detail graphic user interface, accessed using at least one of said plurality of client computers, for the individual specific lot of outstanding secondary market securities within a predetermined time frame, wherein data pertinent to the trade of the individual specific lot of outstanding secondary market securities is dynamically updated and displayed on said auction detail graphic user interface;
   providing real-time dynamic updating, on said auction detail graphic user interface, of information pertaining to said secondary market securities auction whereby the participants have equal access to and knowledge of the bids and said current status of said secondary market securities auction to enable informed trading decisions.

2. The method according to claim 1, further comprising:
   providing a program alert graphic user interface of said computer software application wherein criteria are selected for a notification of activity pertaining to said secondary market securities auction and overall market activity.

3. The method according to claim 2, further comprising:
   displaying the notification of activity pertaining to said secondary market securities auction and overall market activity in an alert graphic user interface of said computer software application.

4. The method according to claim 2, further comprising:
   displaying a system generated notification of activity pertaining to said secondary market securities auction and overall market activity in said alert graphic user interface of said computer software application.

5. The method according to claim 1, further comprising:
   implementing a predetermined decision to automatically increase a bid for the individual specific lot of secondary market securities, by a first participant using said auction detail graphic user interface to enter a starting bid and a maximum bid for the individual specific lot of secondary market securities where the starting bid is greater than a current high bid plus a predetermined minimum increment wherein the maximum bid is not disclosed to any of the plurality of participants.

6. The method according to claim 5, further comprising: systematically increasing the bid by said predetermined minimum increment up to the maximum bid, based on market competition from a bid submitted by at least a second participant.

7. The method according to claim 1, further comprising: displaying on said auction detail graphic user interface at least one of an independent evaluation.

8. The method according to claim 1, further comprising: displaying a spread to an indicative yield curve for the bids in said secondary market securities auction on said auction detail graphic user interface.

9. The method according to claim 1, further comprising: storing, in said database, the criteria used by the participant in the search to identify the individual specific lot of secondary market securities to trade wherein the criteria are available for later retrieval by the participant.

10. The method according to claim 1, further comprising: updating and inserting the individual specific lots of secondary market securities for which a bid is desired by the potential seller thereof of into said database through a direct connection between at least one of said plurality of client computers and at least one said host computer.

11. The method according to claim 1, further comprising: updating and inserting bids for the individual specific lots of secondary market securities into said database through said direct connection between at least one of said plurality of client computers and at least one said host computer.

12. The method according to claim 1, further comprising: updating and inserting the selling orders for executing the trade of the individual specific lots of secondary market securities at the potential seller's discretion into said database through said direct connection between at least one of said plurality of client computers and at least one said host computer.

* * * * *